United States Patent
Peng et al.

(10) Patent No.: US 8,639,031 B2
(45) Date of Patent: Jan. 28, 2014

(54) ADAPTIVE CONTRAST ADJUSTMENT TECHNIQUES

(75) Inventors: Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 13/074,257

(22) Filed: Mar. 29, 2011

(65) Prior Publication Data

US 2012/0250988 A1     Oct. 4, 2012

(51) Int. Cl.
*G06K 9/00* (2006.01)
*G06K 9/40* (2006.01)

(52) U.S. Cl.
USPC .................. 382/170; 382/168; 382/274

(58) Field of Classification Search
None
See application file for complete search history.

(56) References Cited

U.S. PATENT DOCUMENTS

| 7,176,965 | B1 | 2/2007 | Noguchi |
| 7,319,787 | B2 | 1/2008 | Trifonov |
| 7,885,462 | B2 | 2/2011 | Paik |
| 2004/0258324 | A1 * | 12/2004 | Liang et al. ............... 382/274 |
| 2008/0316334 | A1 | 12/2008 | Lee |
| 2010/0080459 | A1 * | 4/2010 | Dai et al. .................. 382/170 |
| 2012/0275700 | A1 * | 11/2012 | Stern et al. ............... 382/168 |

OTHER PUBLICATIONS

PCT International Search Report and Written Opinion issued in corresponding PCT/US/2011/066766 dated Sep. 14, 2012, (10 pages).

\* cited by examiner

*Primary Examiner* — Vikkram Bali

(74) *Attorney, Agent, or Firm* — Trop, Pruner & Hu, P.C.

(57) ABSTRACT

Techniques are disclosed involving contrast adjustment for images. For example, an input image is classified based on its pixel value characteristics, as expressed in an input brightness histogram. From such a classification, a target histogram distribution for a corresponding output image (i.e., a contrast-adjusted transformation of the input image) may be specified. With the target histogram of the output image specified, a transformation function may be derived that maps input image values to output image values. Moreover, transitions of such transformation functions may be smoothed. Such smoothing may provide advantages, such as a reduction in flickering associated with video data.

23 Claims, 9 Drawing Sheets

Original Image

Output Image

ADAPTIVE CONTRAST ADJUSTMENT TECHNIQUES

BACKGROUND

Contrast adjustment is an important feature in many products and applications that process media content. Contrast adjustment techniques aim to emphasize differences in the visual properties of an image to make objects in the image distinguishable from each other and their background.

Contrast adjustment techniques typically involve the application of a transformation function that maps input pixel values to output pixel values. The transformation function aims to generate desired characteristics for the output pixel values. Such desired output pixel characteristics are commonly expressed in the form of a histogram (also referred to as a target histogram).

A transformation function can be automatically determined from the histogram information of an input image and the histogram information of its corresponding transformed output image. Despite this, challenges exist in properly specifying a target histogram for a transformed output image such that a visually pleasurable output image can be expected.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments provide approaches that characterize any input image based on its pixel value characteristics. For example, an input image represented by pixels in YUV color space may be characterized based on its Y (brightness) histogram distribution.

More particularly, such an input histogram may be classified into different distribution types. Exemplary distribution types include (but are not limited to) non-sparse, evenly-sparse, and non-evenly-sparse. From such a classification (e.g., from the category label of its Y histogram), a target histogram distribution for a corresponding output image (i.e., a contrast-adjusted transformation of the input image) may be specified. With the target histogram of the output image specified, a transformation function may be derived that maps input image brightness values (e.g., Y values) to output image brightness values (e.g., Y values).

Moreover, embodiments may smooth temporal transitions of such transformation functions. This may be based on various factors, such as history information and a confidence score of the corresponding content (or input image) classification. Such temporal smoothing may provide advantages, such as a reduction in flickering associated with video data.

Integrated Device Technology, Inc. provides an image testing capability called the HQV Benchmark version 2.0. The HQV Benchmark 2.0 involves video clips and test patterns that have been specifically designed to evaluate and score various video signal processing tasks. In embodiments, a full score provided by the HQV 2.0 benchmark may be achieved when contrast enhancement is performed according to the techniques described herein.

Conventional contrast adjustment techniques employ an approach called histogram equalization. Histogram equalization automatically determines a transformation function that produces an output image having a uniform histogram that equalizes every input histogram distribution. Unfortunately, this approach can lead to undesirable results for certain images, especially those with sparse distribution histograms.

Figure 1:
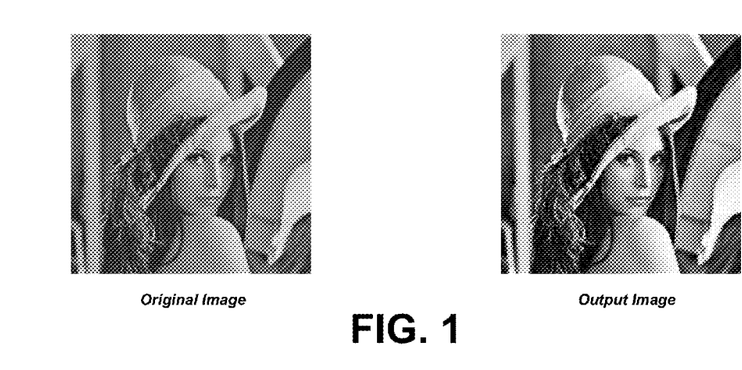
FIG. 1 is a pairing of images associated with a conventional image transformation.
Figure 2A:
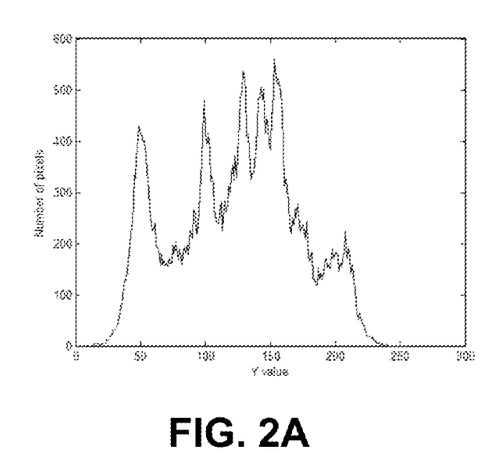
FIGS. 2A and 2B are histograms of the images in FIG. 1.
Figure 2B:
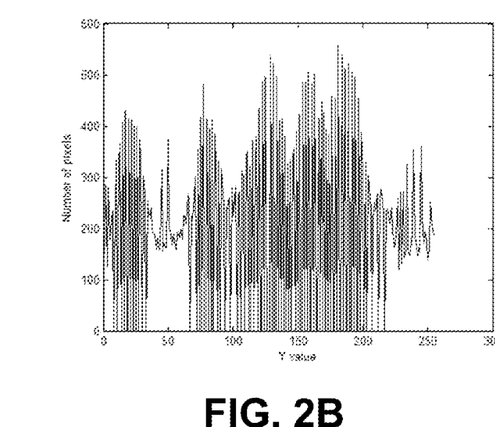
Figure 3:
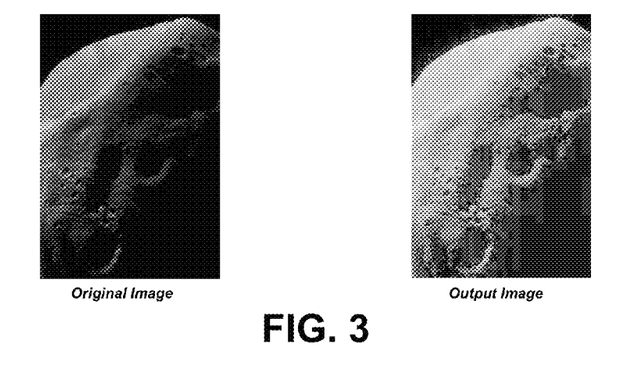
FIG. 3 is a further pairing of images associated with a conventional image transformation.
Figure 4A:
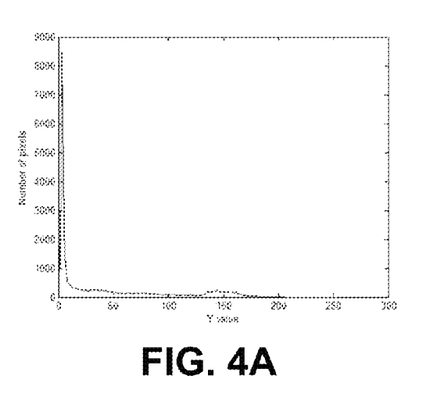
FIGS. 4A and 4B are histograms of the images in FIG. 3.
Figure 4B:
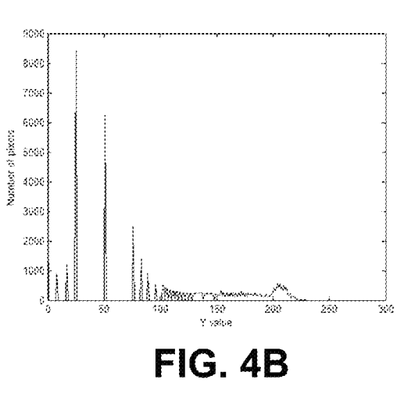

FIG. 1 through FIG. 4B provide examples of contrast adjustment through the histogram equalization approach. For instance, FIG. 1 shows an image transformed according to this technique (from "original image" to "output image"). FIGS. 2A and 2B show brightness histograms of the original image and output image, respectively. Similarly, FIG. 3 shows an image transformed according to the histogram equalization technique (from "original image" to "output image"). FIGS. 4A and 4B show brightness histograms of the original image and output image, respectively.

These examples show that, although histogram equalization can produce visually vivid output images (e.g., as in FIG. 1), blindly distributing the target histogram equally may not be an appropriate contrast adjustment approach for certain images. For example, the contrast adjustment shown in FIG. 3 yields an output image having inferior contrast characteristics.

Such drawbacks of histogram equalization may be overcome by the techniques described herein. These techniques may determine a classification category for an input image, and select a target brightness histogram corresponding to the determined classification category. From this, a transformation function may be obtained. Moreover, the transformation function may be temporally smoothed. Such smoothing may be employed in contexts involving a sequence of images, such as video frames.

Figure 5:
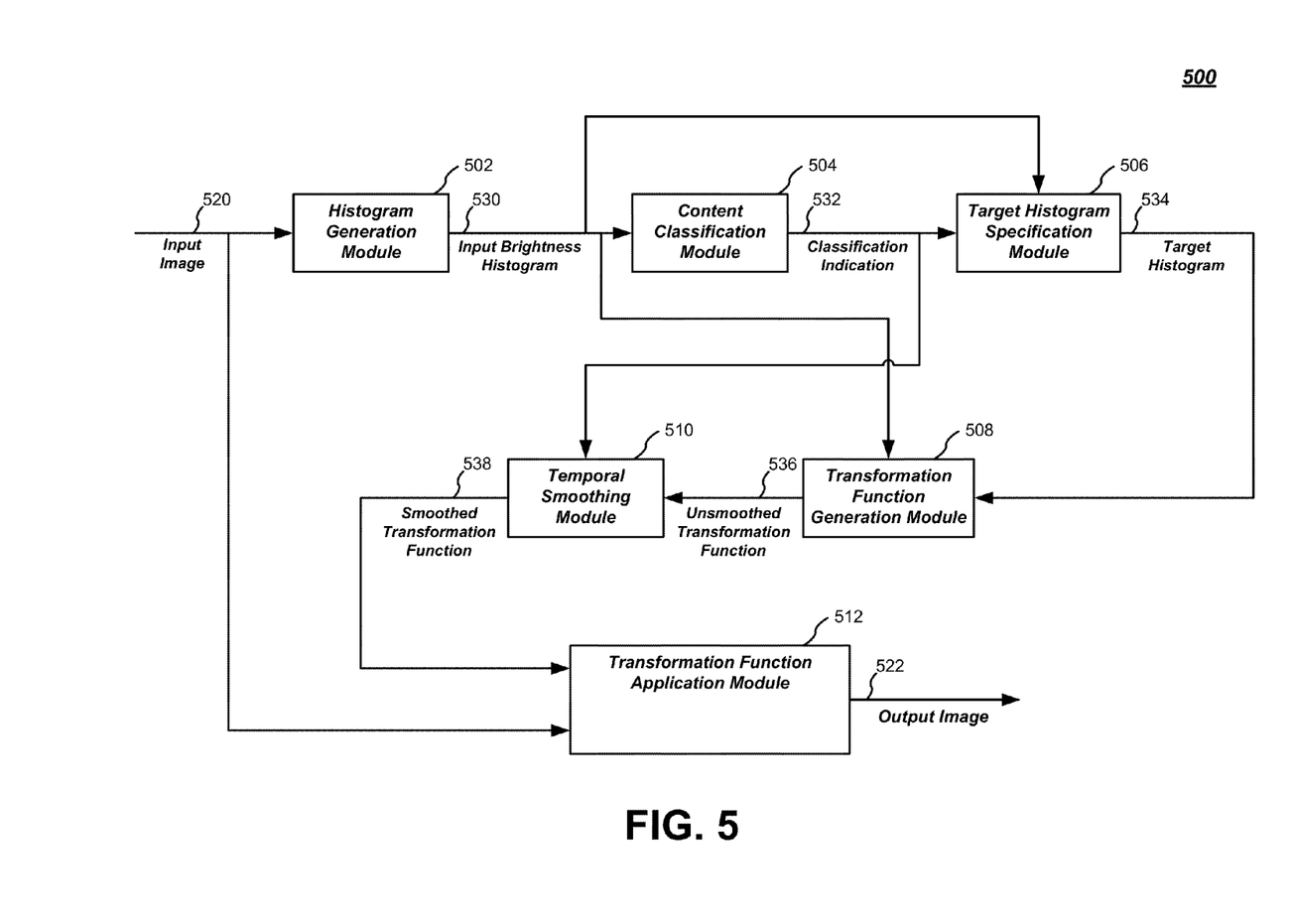
FIG. 5 is a diagram of an exemplary implementation.

FIG. 5 is a block diagram of an exemplary implementation 500, which may employ the techniques described herein. As shown in FIG. 5, implementation 500 includes a histogram generation module 502, a content classification module 504, a target histogram specification module 506, a transformation function generation module 508, a temporal smoothing module 510, and a transformation function application module 512. These elements may be implemented in any combination of hardware and/or software.

In embodiments, the elements of FIG. 5 may be included in various components and/or devices. Examples include microprocessors, graphics processors or engines, microcontrollers, application specific integrated circuits (ASICs), and so forth. Further examples include cameras, personal digital assistants (PDAs), mobile phones, smartphones, personal computing devices (e.g., desktop devices, laptop devices, tablet devices, etc.), servers, wearable devices, and so forth. Embodiments, however, are not limited to these examples.

As shown in FIG. 5, implementation 500 receives an input image 520 (at module 502), and produces a corresponding output image 522 (at module 512). Output image 522 may be a transformation of input image 520 so that its contrast characteristics are adjusted (e.g., enhanced). In embodiments, images 520 and 522 may be part of a sequence of images (e.g., video images or frames).

Input image 520 and output image 522 may each include values for multiple pixels. These values may be represented as YUV color space coordinates. However, other pixel value representations (e.g., Y'UV color space coordinates) may be employed.

Histogram generation module 502 receives input image 520. In turn, histogram generation module 502 generates an input brightness histogram 530 pertaining to the brightness values (or Y values) of input image 520. In embodiments, this histogram is a normalized cumulative histogram. Details regarding an exemplary generation of such a normalized cumulative brightness histogram 530 are provided below.

As shown in FIG. 5, histogram 530 is sent to content classification module 504. Based on this histogram, content classification module 504 may classify the histogram into one of multiple distribution categories. As described herein, exemplary categories may be non-sparse, evenly sparse, and non-evenly sparse. Embodiments, however, are not limited to these categories. FIG. 5 shows that a classification indication 532 is provided to target histogram specification module 506.

In turn, target histogram specification module 506 determines a corresponding target histogram 534 for output image 522. FIG. 5 shows that this determination may be based on classification indication 532 and histogram 530. As shown in FIG. 5, target histogram 534 is indicated to transformation function generation module 508.

Transformation function generation module 508 produces a transformation function for the generation of output image 522 from input image 520. This may be based at least on the determined output histogram (e.g., as specified by indication 534). Further, production of this transformation function may also be based on histogram 530. This transformation function is sent to temporal smoothing module 510 (as unsmoothed transformation function 536).

Upon receipt, temporal smoothing module 510 may perform smoothing operations on unsmoothed transformation function 536. This produces a smoothed transformation function 538, which is sent to transformation function application module 512. FIG. 5 shows that such operations may be based on various inputs, such as classification indication 532, and one or more previously smoothed transformation functions 535

FIG. 5 shows that transformation function application module 512 receives input image 520 and smoothed transformation function 538. In turn, transformation function application module 512 applies function 538 to input image 520. This produces output image 522.

As described herein, embodiments may generate a brightness histogram of an input image. For example, in the context of FIG. 5, such histograms may be generated by histogram generation module 502.

For a B-bit YUK image I spanning in the range of $[0, 2^B-1]$, an N-bin, equally spaced Y histogram may be denoted as $h[k]$.

The normalized cumulative histogram of I, $h_c[k]$, can be calculated as expressed in Equation (1) below.

$$h_c[k] = \frac{\sum_{i=0}^{k} h[i]}{\sum_{i=0}^{N-1} h[i]}, k = 0, 1, \ldots, N-1 \tag{1}$$

In the context of FIG. 5, histogram generation module 502 may determine a non-cumulative brightness histogram from a Y channel of input image 502. In turn, histogram generation module 502 may further calculate a normalized cumulative input brightness histogram (as histogram 530) in accordance with Equation (1). Embodiments, however, are not limited to this context or to this equation.

From this histogram, embodiments may determine a corresponding output histogram (also referred to as a target histogram). This involves categorizing the input image based on characteristics of the input image's histogram.

More particularly, the inventors have discovered that improved contrast adjustment results may be achieved by separately performing histogram specification over different categories of input histograms. For instance, three main categories of input histograms may be employed: non-sparse, evenly-sparse, and non-evenly-sparse.

Non-sparse histograms refer to histograms having relatively-flat distributions. Evenly-sparse histograms refer to histograms having two (or two clusters of) comparable dominant bins which are substantially separated from each other. Non-evenly-sparse histograms refer to histograms with non-comparable dominant bins that are substantially separated from each other.

Figure 6A:
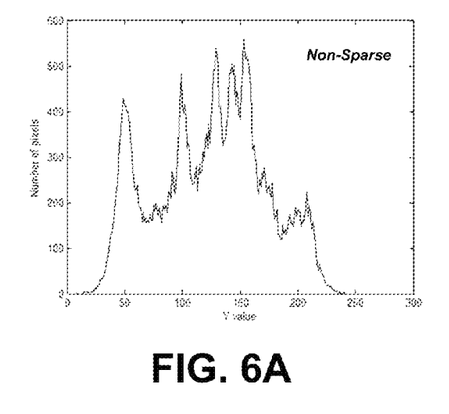
FIGS. 6A-6D are graphs of histograms.
Figure 6B:
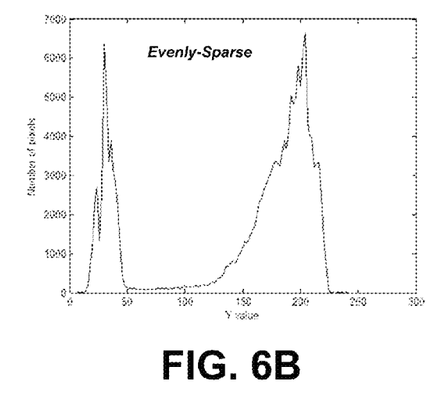
Figure 6C:
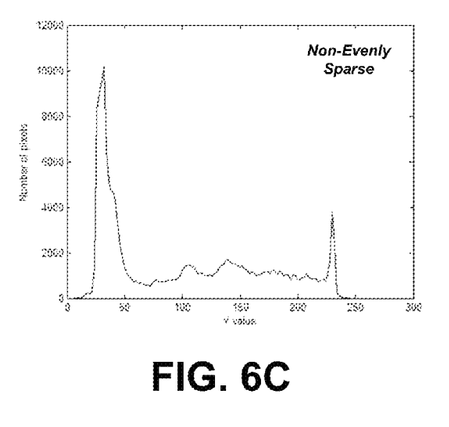
Figure 6D:
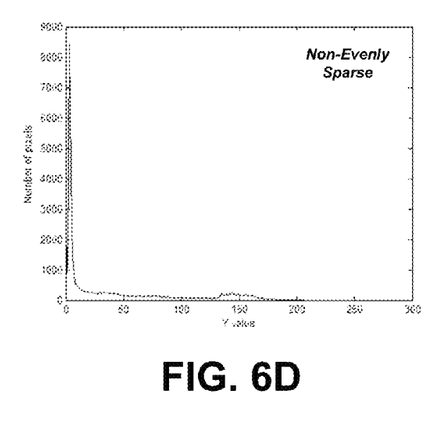

FIGS. 6A-6D are graphs of histograms in these categories. For instance, FIG. 6A is an example of a non-sparse histogram. FIG. 6B is an example of an evenly-sparse histogram. FIGS. 6C and 6D are examples of non-evenly-sparse histograms.

To distinguish between these three types of distributions, embodiments may employ an indicator that quantifies a level of sparseness of a histogram. This indicator is referred to herein as a Histogram Separation Ratio (HSR). The HSR may be derived from the information of the second derivative of the normalized cumulative input histogram, expressed below in Equation (2).

$$h''_c[k] = h_c[k+1] + h_c[k-1] - 2h_c[k], k=1, \ldots, N-2 \tag{2}$$

Derivation of the HSR from the normalized cumulative input histogram is described below with reference to Equations (3) through (6).

$$t_c[k] = \begin{cases} 1, & \text{if } h''_c[k] \geq rM \\ 0, & \text{otherwise} \end{cases}, r \in [0, 1], k = 1, \ldots, N-2, \tag{3}$$

where M is the maximum value of $h''_c[k]$. Assuming $$l \in \arg[l] = 1, d_c[k],$$

the sequence representing the interval between impulses in $t_c[k]$, is calculated as expressed in Equation (4).

$$d_c[k] = l^r[k+1] - l^r[k], k \in \text{int}. \tag{4}$$

l' in the above equation is the sorted version of l in an ascendant way. Based on Equation (2) to Equation (4), HSR may be defined in accordance with Equation (5).

$$HSR = \frac{\max(d_c[k])}{BW},$$ (5)

In Equation (5), BW is the estimated dynamic range of I. BW may be calculated, as expressed below in Equation (6).

$$BW = \min\left(\arg_k h_c[k] \geq th_2\right) - \min\left(\arg_k h_c[k] \geq th_1\right),$$ (6)

$$th_2 > th_1, k = 0, 1, \ldots, N-1.$$

Based on the HSR determined by Equation (5), a classification, c, of the input histogram may be determined, as expressed below in Equation (7-1).

$$c = \begin{cases} \text{non-sparse,} & \text{if } HSR \leq th_{HSR} \\ \text{evenly-sparse,} & \text{if } HSR > th_{HSR} \& \\ & |p1 - p2| \leq r' \max(p1, p2), \\ \text{non-evenly-sparse,} & \text{if } HSR > th_{HSR} \& \\ & |p1 - p2| > r' \max(p1, p2) \end{cases}$$ (7-1)

with:

$$p1 = \max(h_c[k] | k_{lower} \leq k \leq k_{l_r\_low}),$$ (7-2)

$$p2 = \max(h_c[k] | k_{l_r\_high} \leq k \leq k_{upper}), \text{ and } r \in [0,1].$$ (7-3)

$k_{l_r\_low}$, $k_{l_r\_high}$, $k_{lower}$ and $k_{upper}$ in the above equations are parameters related to Equation (4) and Equation (6). That is $$k_{l_r\_low} = l\left[\max_{\arg k} d_c[k]\right], k_{l_r\_high} = l\left[\max_{\arg k} d_x[k] + 1\right],$$ (7-4)

$$k_{lower} = \min\left(\arg_k h_c[k] \geq th_1\right), \text{ and}$$ (7-5)

$$k_{upper} = \min\left(\arg_k h_c[k] \geq t_2\right).$$

In the context of FIG. 5, the classification of an input histogram (e.g., performance of Equations (2) through (7-5)) may be performed by content classification module 504. Embodiments, however, are not limited to this context or to these equations.

Denoting the result of an image I after contrast adjustment is applied on it as $I_{out}$, the Y histogram of $I_{out}$ as t[k], can be calculated as the formula in Equation (1).

Instead of directly specifying $t_c[k]$ for I, we utilize a five points Piece Wise Linear Function (PWLF) controlled by the category label of I as an approximation of $t_c[k]$ to implicitly specify t[k]. The five anchor points (i.e., $(pnt, t_c^s[pnt])$) constructing an approximated $t_c[k]$ for each type of input content is derived as $c$ = non-sparse $$\begin{cases} pnt = \{k_{min\_hist}, k_{ps1}, k_{ps2}, k_{ps3}, k_{max\_hist}\} \\ t_c^s[pnt] = \{0, (2^B-1)h_c[k_{ps1}], (2^B-1)h_c[k_{ps2}], \\ (2^B-1)h_c[k_{ps3}], 1\} \end{cases}$$ (8-1)

Where:

$$k_{min\_hist} = \min_k \arg(h_c[k] \geq 0), \text{ and}$$ (8-2)

$$k_{max\_hist} = \min_k \arg(h_c[k] \geq 1).$$ (8-3)

$k_{ps1}$, $k_{ps2}$, and $k_{ps3}$ in Eq. (8-1) are sorted version of indices correspond to the three dominant peaks in h[k] in an ascendant way.

$c$ = evenly-sparse $$\begin{cases} pnt = \{k_{min\_hist}, r_{hist\_exp}k_{left\_peak}, r_{hist\_exp}r_{exp\_sub}k_{l_r\_low}, \\ r_{hist\_comp}k_{right\_peak}, k_{max\_hist}\} \\ t_c^s[pnt] = \{0, h_c[k_{left\_peak}], h_c[k_{l_r\_low}], h_c[k_{right\_peak}], 1\} \end{cases}$$ (9-1)

Where:

$$k_{left\_peak} = \arg_k \max(h_c[k] | k_{lower} \leq k \leq k_{l_r\_low}), \text{ and}$$ (9-2)

$$k_{right\_peak} = \arg_k \max(h_c[k] | k_{l_r\_hight} \leq k \leq k_{upper}).$$ (9-3)

$r_{hist\_exp}$ ($\geq 1$) and $r_{hist\_exp}r_{exp\_sub}$ (with $r_{exp\_sub} \leq 1$) in Equation (9-1) reflect the concept of histogram expansion for the lower part of an evenly-sparse histogram. On the contrary, $r_{hist\_comp}$ ($\leq 1$) reflects the concept of histogram compression for the higher part of the histogram.

$c$ = non-evenly-sparse $$\begin{cases} pnt = \{k_{min\_hist}, r_{hist\_exp}r_{exp\_sub2}k_{l_r\_low\_half}, \\ r_{hist\_exp}k_{l_r\_low}, r_{hist\_exp2}k_{upper}, k_{max\_hist}\}, \text{ if } p_1 > p_2 \\ t_c^s[pnt] = \{0, h_c[k_{l_r\_low\_half}], h_c[k_{l_r\_low}], h_c[k_{upper}], 1\} \end{cases}$$ (9-4)

$$\begin{cases} pnt = \{k_{min\_hist}, r_{hist\_exp2}k_{lower}, \\ r_{hist\_exp}r_{exp\_sub2}k_{l_r\_high}, \\ r_{hist\_exp}k_{upper}, k_{max\_hist}\}, \text{ otherwise,} \\ t_c^s[pnt] = \{0, h_c[k_{lower}], h_c[k_{l_r\_high}], h_c[k_{upper}], 1\} \end{cases}$$ (9-5)

Where $$k_{l_r\_low\_half} = \min_k \arg[h_c[k] \geq (h_c[k_{l_r\_low}]/2)].$$ (9-6)

In the above equations, $r_{hist\_exp} \geq r_{hist\_exp2} \leq 1$, and $r_{exp\_sub2} \geq 1$ have been made to achieve different levels of expansion (or even just maintenance) for different parts of an input histogram.

With the target normalized cumulative histogram (i.e., $t_c[k]$) specified for different types of input content, the transformation function F mapping the input Y value to the output Y value (i.e., $F: k \rightarrow k_{out}$) can be derived from the following concept.

$$H_c: k \rightarrow h_c[k], T_c: k_{out} \rightarrow t_c[k_{out}] \Rightarrow F[k] = H_c^{-1} T_c[k_{out}]. \quad (9\text{-}7)$$

One can realize that $H_c$ and $T_c$ are exactly the same functions calculating the normalized cumulative histogram presented in Equation (1). Since a five-point PWLF is utilized to approximate $t_c[k]$, the resulting transformation function is also a five-point PWLF where the sampling points are expressed below in Equation (9-8).

$$F^s[k] = H_c^{-1} T_c^s[k_{out}], k_{out} \in pnt. \quad (9\text{-}8)$$

As described above, embodiments may perform temporal smoothing of transformation functions.

For instance, when performing contrast adjustments on video data, operations described herein (e.g., content classification, target histogram specification, and transformation function determination) are applied to every video image (frame). However, instead of applying the transformation function $F[k]$ instantly on every video frame, embodiments may employ a smoothing transformation function $F_{final}[k]$, which incorporates temporal smoothing. Also, such smoothing may be based on a confidence level of the content classification. This may advantageously eliminate any possible flickering.

The confidence score of the classification of an input Y histogram may be calculated, as expressed below in Equation (10).

$$\alpha = \begin{cases} \frac{th_{HSR} - HSR}{th_{HSR}}, & \text{if } c = \text{non-sparse} \\ \gamma \min\left(\frac{HSR - th_{HSR}}{th_{HSR}}, 1\right) + (1 - \gamma)\left(r' - \frac{|p_1 - p_2|}{\max(p_1, p_2)}\right), \\ & \text{if } c = \text{evenly-sparse} \\ \gamma \min\left(\frac{HSR - th_{HSR}}{th_{HSR}}, 1\right) + (1 - \gamma)\left(1 - r' - \frac{|p_1 - p_2|}{\max(p_1, p_2)}\right), \\ & \text{if } c = \text{non-evenly-sparse}, \end{cases} \quad (10)$$

With $\gamma \in (0,1)$.

Denoting the transformation function applied on the video frame at time t as $F_{t\_final}[k]$, $F_{t\_final}[k]$ then combines the instant transformation function (i.e., $F_t[k]$ present in Equation (9-7)), the history function (i.e., $F_{t-1\_final}[k]$), and the identity function (i.e., $ID[k]$) to achieve a smooth contrast adjustment process. This process is expressed below in Equation (11).

$$F_{t\_final}[k] = (1-\beta) F_{t-1\_final}[k] + \beta[\alpha F_t[k] + (1-\alpha) ID[k]], \quad (11)$$

In Equation (11), $\beta \in (0,1)$ is a factor adaptive to the difference between $F_{t\_final}[k]$ and $F_{t-1\_final}[k]$.

Figure 7:
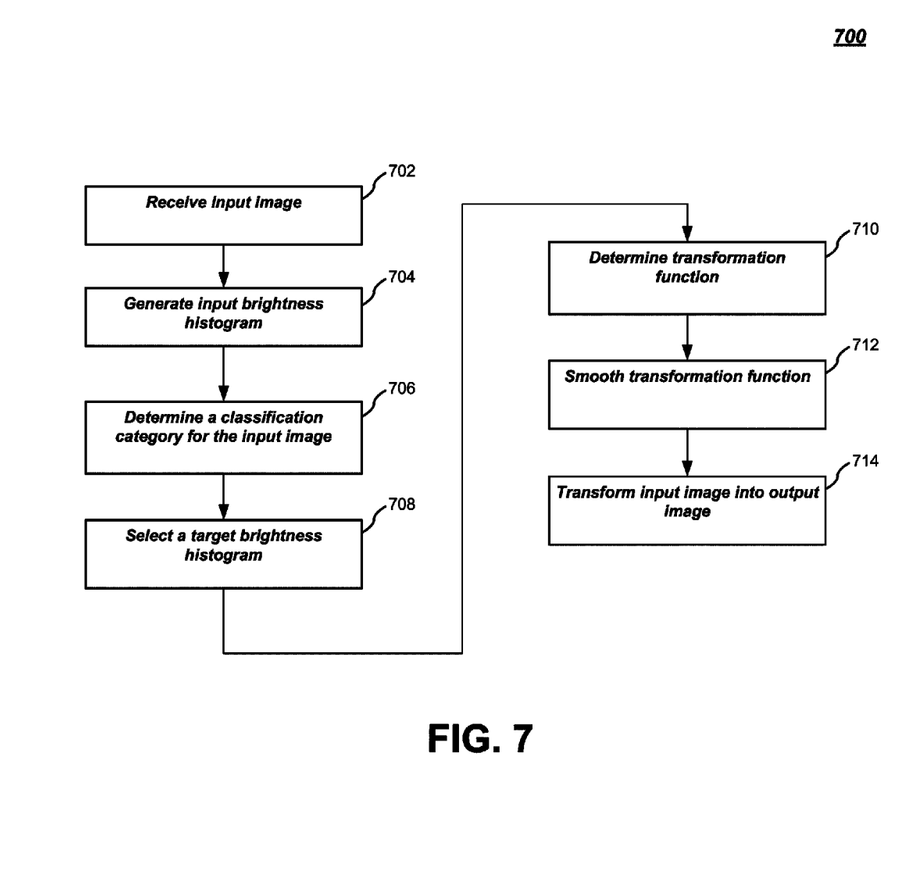
FIG. 7 is an exemplary logic flow diagram.

FIG. 7 illustrates an exemplary logic flow 700, which may be representative of operations executed by one or more embodiments described herein. Thus, this flow may be employed in the contexts of FIG. 5. Embodiments, however, are not limited to this context. Also, although FIG. 7 shows particular sequences, other sequences may be employed. Moreover, the depicted operations may be performed in various parallel and/or sequential combinations.

At a block 702, an input image is received. This input image has a plurality of pixel values. Each of the pixel values is encoded according to a color space having a brightness component. For example, a YUV color space may be employed. Embodiments, however, are not limited to this color space.

An input brightness histogram of the input image is generated at a block 704. As described herein, this may be a normalized cumulative brightness histogram.

Based at least on the brightness histogram, a classification category for the input image is determined at a block 706. The determination may be from multiple classification categories. For instance, as described herein, the multiple categories may include a non-sparse category, an evenly sparse category, and a non-evenly sparse category.

At a block 708, a target brightness histogram is specified. This target histogram corresponds to the determined classification category of the input image. From this, a transformation function is determined at a block 710. This determination is based at least on the input brightness histogram and the target brightness histogram.

At a block 712, the transformation is smoothed.

At a block 714, the transformation function is employed to produce an output image from the input image.

Figure 8A:
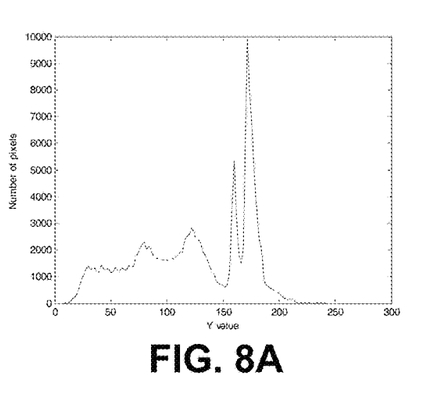
FIGS. 8A-8C are graphs involving a histogram separation ratio (HSR)
Figure 8B:
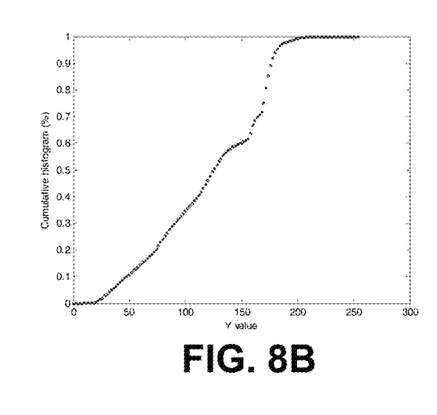
Figure 8C:
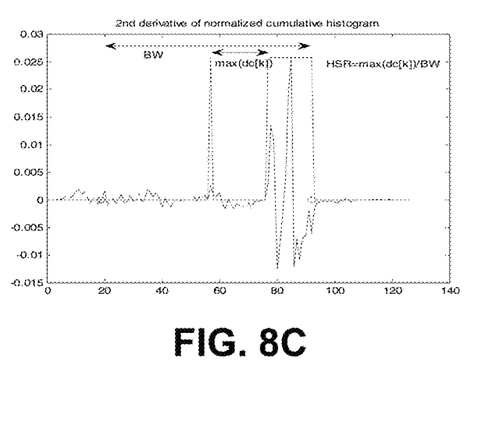

As described above, an indicator, such as the aforementioned HSR, may be employed in the classification of input images. For instance, an HSR may be used to analyze the level of sparseness of a histogram distribution. An illustrative example involving an HSR is provided in the graphs of FIGS. 8A-8C. More particularly, FIG. 8A is a graph of an original (non-cumulative) histogram for an input image. A graph of the corresponding normalized cumulative histogram is provided in FIG. 8B. FIG. 8C is a graph showing the second derivative of the normalized cumulative histogram, as well as parameters (i.e., BW, and $\max(d_c[k])$ that are used in calculating HSR.

Figure 9:
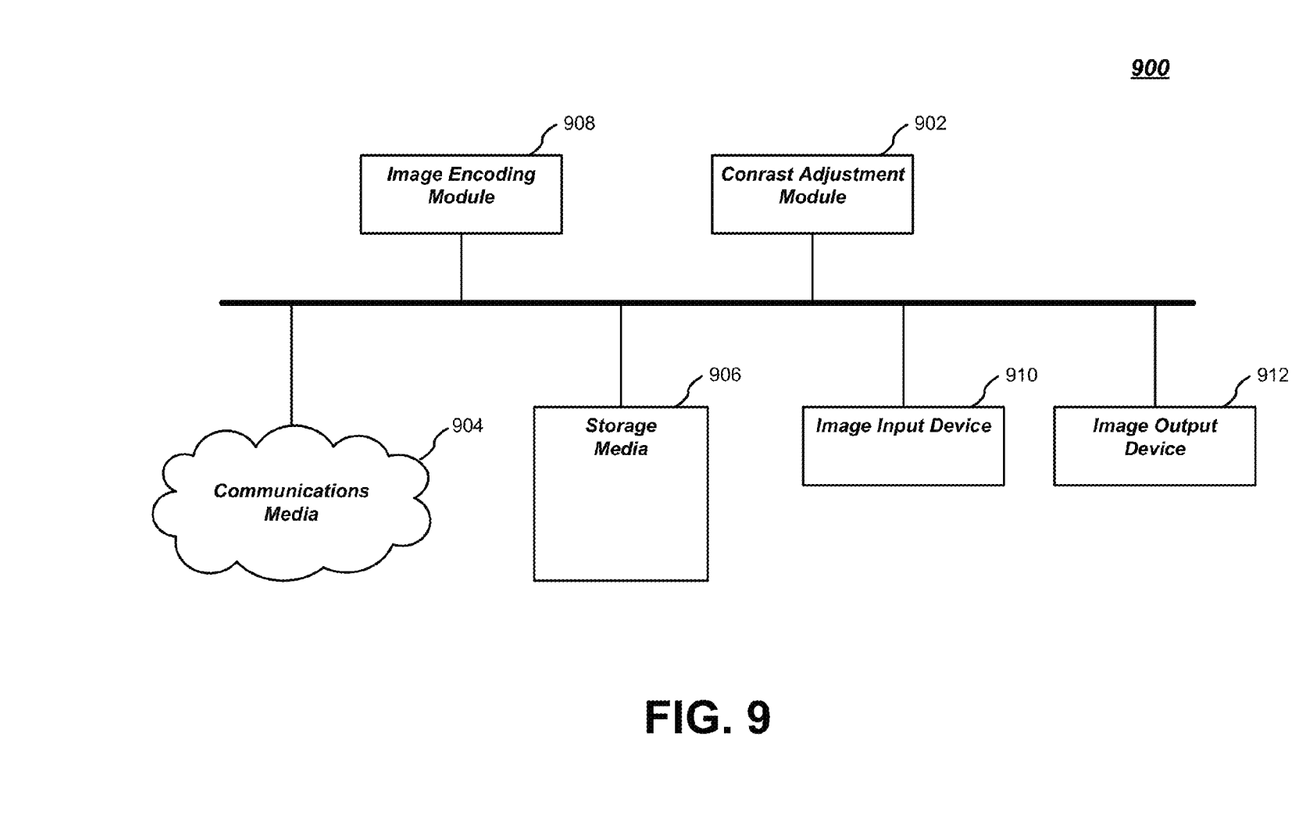
FIG. 9 is a diagram of an exemplary apparatus.
Figure 10A:
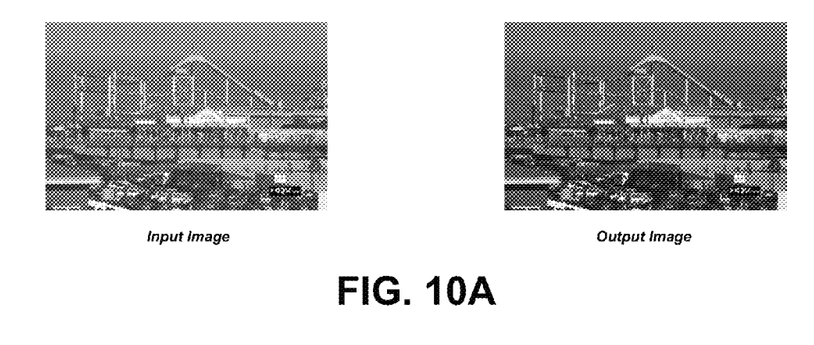
FIGS. 10A-10D are pairings of input and output images associated with the contrast adjustment techniques described herein.
Figure 10B:
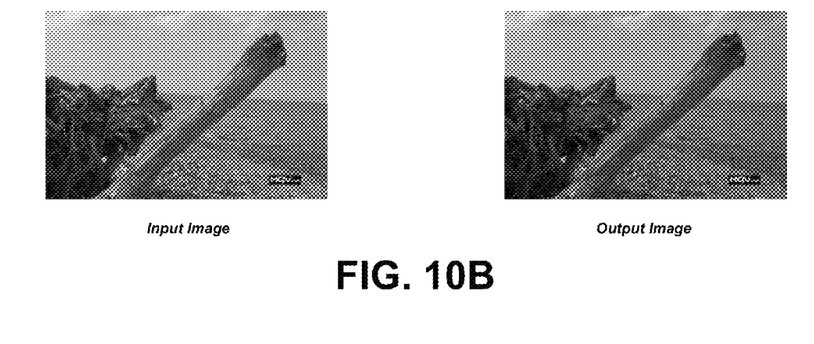
Figure 10C:
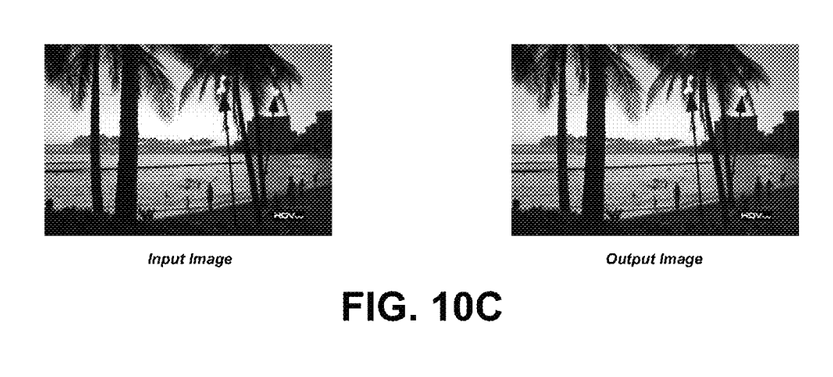
Figure 10D:
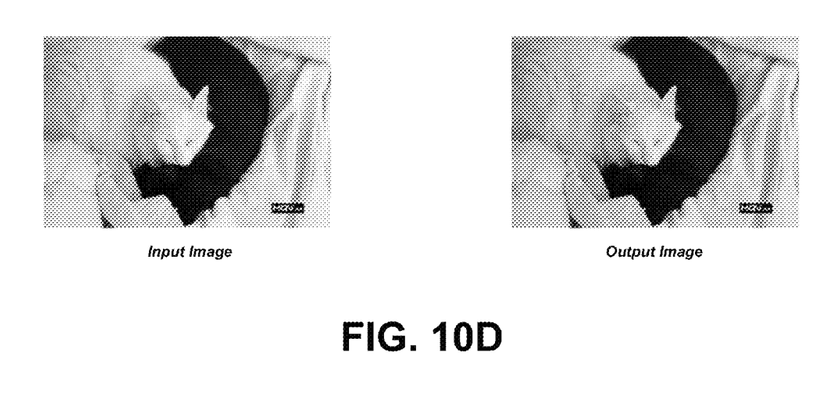

FIG. 9 is a diagram of an exemplary system 900 in which the techniques described herein may be employed. As shown in FIG. 9, system 900 may include a contrast adjustment module 902, communications media 904, storage media 906, an image encoding module 908, an image input device 910, and an image output device 912. These elements may be implemented in any combination of hardware and/or software.

In embodiments, the elements of FIG. 9 may be included in various components and/or devices. As described herein, examples of such components and/or devices include microprocessors, graphics processors or engines, microcontrollers, ASICs, and so forth. Further examples include cameras, personal digital assistants (PDAs), mobile phones, smartphones, personal computing devices (e.g., desktop devices, laptop devices, tablet devices, etc.), servers, wearable devices, and so forth. Embodiments, however, are not limited to these examples.

Contrast adjustment module 902 performs contrast adjustment techniques, as described herein. Accordingly, content adjustment module 902 may include elements of FIG. 5. Additionally or alternatively, content adjustment module 902 may perform operations of FIG. 7. Thus, content adjustment module 902 may receive input images and produce corresponding transformed (adjusted) output images. Such images may be as isolated images, or as a sequence of images (e.g., as video images or frames).

These input and output images may be received from or sent to various entities. Such entities may include any combination of communications media 904, storage media 906, image encoding/decoding module 908, and/or image input device 910.

Communications media 904 may include any combination or wired and/or wireless media that may convey information. Examples of such media include (but are not limited to) wireless communications networks, wired communications networks, optical networks/interfaces, computer bus systems, computer interfaces (e.g., serial and/or parallel interfaces), and so forth.

In embodiments, storage media 906 may store input images and/or output images. Storage media 906 may include various tangible (e.g., electronic, optical, magnetic, etc.) media that may store information. Such media may include (but is not limited to) memory, disk drives, optical storage devices, and so forth.

Further, storage media 906 may store control logic or instructions (e.g., software) that may cause a processor (e.g., a microprocessor) to perform the techniques described herein. Thus, such a processor (for instance, a CPU, a graphics processor, microcontroller, ASIC, etc.) may provide the features of contrast adjustment module 902.

Also, storage media 906 may store operational data. Such data may be associated with the techniques described herein. Examples of such operational data include (but are not limited to) threshold values, predetermined target historgrams corresponding to various content classification categories, parameters, constants, etc.).

Image encoding module 908 may encode image data into a format that is acceptable to contrast adjustment module 902. Such a format may involve encoding pixels using a color space having a brightness component (e.g., a YUV color space).

Image input device 910 may include one or more sensors (e.g., camera(s)) that generate image data from incident radiation (e.g., incident light). In turn, such image data may be provided as input image(s) to content adjustment module 902 for contrast adjustment. Alternatively, such image data may be first provided to image encoding/decoding module 908 for encoding into a format that may be accommodated by contrast adjustment module 902 (e.g., a format employing a YUV color space).

Image output device 912 may visually display output images (e.g., images received from contrast adjustment module 902) to a user. In embodiments, image output device 912 may include a display device that provides a visual output to a user. Exemplary display devices include (but are not limited to) liquid crystal displays (LCDs), light emitting diode (LED) displays, plasma displays, cathode ray tube (CRT) displays, and so forth.

The techniques described herein have been applied to complete the contrast enhancement task specified in the HQV2.0 benchmark. FIGS. 10A-10D provide examples of image pairings in which contrast adjustment has been performed in accordance with the techniques described herein. Although these images are shown in grayscale, the original images (as subjected to contrast adjustment) are color images represented in YUV colorspace coordinates.

These images demonstrate that specifying target histograms based on the input content not only leads to visually pleasant results, but also fulfills various requirements listed in the HQV 2.0 Benchark. For example, overall contrast is expanded in the adjustments of FIGS. 10A and 10B. Also, darker areas have more details without increasing overall brightness in the adjustment of FIG. 10C. Further, overall contrast is reduced while more detail is visible in the bright and dark areas in the adjustment of FIG. 10D.

As described herein, various embodiments may be implemented using hardware elements, software elements, or any combination thereof Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
generating an input brightness histogram of an input image;
based at least on the input brightness histogram, determining a classification category for the input image, the determined classification category from a plurality of classification categories;
specifying a target brightness histogram corresponding to the classification category of the input image;
generating a transformation function based at least on the input brightness histogram and the target brightness histogram;
smoothing the transformation function based on a confidence level of the determined classification category; and producing an output image from the input image based at least on the transformation function.

2. The method of claim 1, wherein the smoothing is further based on one or more previous transformation functions.

3. The method of claim 1, wherein the input image is a frame in a sequence of video frames.

4. The method of claim 1, wherein the plurality of classification categories includes a non-sparse category, an evenly sparse category, and a non-evenly sparse category.

5. The method of claim 1, wherein the input image includes a plurality of YUV pixel values, and the output image includes a plurality of YUV pixel values.

6. The method of claim 1, further comprising determining a separation indicator corresponding to the input brightness histogram;
wherein said determining the classification category for the input image is based on the separation indicator.

7. The method of claim 1, wherein the input brightness histogram is a normalized cumulative input brightness histogram.

8. The method of claim 7, wherein the separation indicator is based on a second derivative of the normalized cumulative input brightness histogram.

9. The method of claim 1, wherein the target brightness histogram is a piecewise linear function.

10. An apparatus, comprising:
a hardware histogram generation module to generate an input brightness histogram of an input image;
a content classification module to, based at least on the brightness histogram, determine a classification category for the input image;
a target histogram specification module to specify a target brightness histogram corresponding to the classification category of the input image;
a transformation function derivation module to generating a transformation function based at least on the input brightness histogram and the target brightness histogram and to smooth the transformation function based on a confidence level of the determined classification category.

11. The apparatus of claim 10, further comprising a transformation function application module to generate an output image from the input image based on the transformation function.

12. The apparatus of claim 10, further comprising a smoothing module to smooth the transformation function.

13. The apparatus of claim 12, wherein the smoothing module is to smooth the transformation function based on a confidence level of the determined classification category.

14. The apparatus of claim 13, wherein the smoothing module is to smooth the transformation function based on one or more previous transformation functions.

15. The apparatus of claim 10, wherein the input brightness histogram is a normalized cumulative brightness histogram.

16. The apparatus of claim 10, wherein the input brightness histogram is based on a brightness channel of the input image.

17. The apparatus of claim 16, wherein the brightness channel is a Y channel.

18. An article comprising a non-transitory computer-accessible medium having stored thereon instructions that, when executed by a computer, cause the computer to:
generate an input brightness histogram of an input image;
based at least on the input brightness histogram, determining a classification category for the input image, the determined classification category from a plurality of classification categories;
specify a target brightness histogram corresponding to the classification category of the input image;
generate a transformation function based at least on the input brightness histogram and the target brightness histogram; and
smooth the transformation function based on a confidence level of the determined classification category; and
produce an output image from the input image based at least on the transformation function.

19. The medium of claim 18, wherein the separation indicator is based on a second derivative of the normalized cumulative input brightness histogram.

20. The medium of claim 18, wherein the target brightness histogram is a piecewise linear function.

21. A method, comprising:
generating an input brightness histogram of an input image;
based at least on the input brightness histogram, determining a classification category for the input image, the determined classification category from a plurality of classification categories;
specifying a target brightness histogram corresponding to the classification category of the input image;
generating a transformation function based at least on the input brightness histogram and the target brightness histogram; and
producing an output image from the input image based at least on the transformation function, wherein the input brightness histogram is a normalized cumulative input brightness histogram, wherein the separation indicator is based on a second derivative of the normalized cumulative input brightness histogram.

22. The method of claim 21, further comprising:
smoothing the transformation function.

23. The method of claim 22, wherein the smoothing is based on a confidence level of the determined classification category.

* * * * *